United States Patent [19]

Assarsson et al.

[11] Patent Number: 4,469,524

[45] Date of Patent: Sep. 4, 1984

[54] CONTINUOUS PROCESS AND APPARATUS FOR MODIFYING CARBOHYDRATE MATERIAL

[75] Inventors: Per G. Assarsson, Toronto; Joseph H. Nagasuye, Mississauga, both of Canada

[73] Assignee: St. Lawrence Technologies Limited, Mississauga, Canada

[21] Appl. No.: 402,030

[22] Filed: Jul. 26, 1982

Related U.S. Application Data

[63] Continuation-in-part of Ser. No. 167,543, Jul. 10, 1980, which is a continuation-in-part of Ser. No. 070,438, Aug. 28, 1979, abandoned.

[51] Int. Cl.³ .............................................. C13K 1/06
[52] U.S. Cl. ........................................ 127/1; 127/28; 422/197; 422/202; 422/224
[58] Field of Search ............... 127/1, 28, 23; 422/197, 422/202, 224; 366/280

[56] References Cited

U.S. PATENT DOCUMENTS

3,087,797  4/1963  Bogart .......................... 422/197
4,137,094  1/1979  Hughes .......................... 127/1
4,230,503 10/1980  Hughes .......................... 127/1

Primary Examiner—William F. Smith
Attorney, Agent, or Firm—Wegner & Bretschneider

[57] ABSTRACT

A process and apparatus are described for producing a modified carbohydrate material, preferably starch, in fluid form. In the process a starch slurry is continuously moved through a confined tubular preheat zone where heat is very rapidly transferred to the slurry, whereby the slurry passes through a gelation stage and forms into a hot free flowing liquid. The heat transfer is from superatmospheric steam surrounding at least part of the tubular heating zone, the temperature of the steam and the cross-sectional area of each tubular preheat zone being selected to rapidly transfer heat from the steam throughout the slurry and minimize the magnitude of the zone of high viscosity gel formed during the gelation stage. The hot liquid formed is immediately forced through a restrictive opening and into a confined tubular reaction zone accompanied by a sudden decrease in pressure whereby the starch is made highly reactive. The reactive starch liquid, together with a reactive adjunct such as acid, is then continuously moved through a tubular reaction zone to produce a modified starch product in fluid form. A steam heated reactor for the above process is also described.

15 Claims, 16 Drawing Figures

CONTINUOUS PROCESS AND APPARATUS FOR MODIFYING CARBOHYDRATE MATERIAL

BACKGROUND OF THE INVENTION

This invention relates to an apparatus primarily for processing carbohydrate material, such as starch, and is a continuation-in-part of Ser. No. 167,543 filed July 10, 1980, which is a continuation-in-part of Ser. No. 070,438, filed Aug. 28, 1979 abandoned.

A variety of long chain, high molecular weight carbohydrate materials are known, of which starch is typical. When these are treated with a solvent, usually under pressure, they reach a stage allowing the polymer chain to obtain and maintain many conformational states. Such a stage is normally associated with a viscosity decrease. The solvent used is usually water, although other solvents can also be used. As this relates to starch, raw starches in their usual commercial form are insoluble in water but may be formed into a colloidal or semi-colloidal dispersion by forming a slurry with water and heating the starch slurry to an elevated temperature at which the starch granules swell or burst and thus become "gelatinized". The particular temperature required for gelatinization depends upon the particular starch selected and on other conditions maintained during the gelatinization. The properties of such gelatinized dispersions depend upon many factors such as temperature and concentration, and also upon the starch material itself and the manner in which the dispersion is prepared.

This gel-forming characteristic of starch slurries when heated has always presented difficulties in processes for reacting starch with other reagents. Traditionally these starch reactions have been carried out in batch vessels over long periods of time.

There has been some degree of success with continuous starch reactions and, for instance, there are on the market continuous starch hydrolyzation systems in which the starch slurry is simply pumped through a long heating coil within which the hydrolysis takes place. Such systems are demanding on plant space, as well as energy and also have limitations as to the degree of reaction that can be achieved. Thus, in hydrolyzing starch, the maximum D.E. value that can be satisfactorily achieved in a system of the above type is in the order of about 50. When high D.E. syrups are required, e.g. at least 70 D.E. syrups, an enzyme conversion process has been required.

A significant step forward in the field of starch reactions can be found in the process of Hughes, U.S. Pat. No. 4,137,094, in the Hughes process a starch slurry is pumped through a primary heating coil whereby it passes through the gelation stage and into the form of a hot free-flowing liquid. This liquid is then forced under high pressure through a restrictive opening into a confined tubular reaction zone and this has the effect of greatly increasing the reactivity of the starch slurry.

The Hughes apparatus operated with an oil bath and when this was operated at a moderate temperature of about 170° C., satisfactory syrups could be produced up to about 70 D.E. However, for rapid conversion this could be achieved only at excessive pressures of usually more than about 1200 psi and no pumps have been found among the most sophisticated industrial pumps available which do not quickly break down under the conditions of trying to feed an acidic starch slurry at such extreme pressures.

It was found that flow rates greatly increased and pressures dropped by increasing the temperature of the oil bath, but this resulted in a decrease in quality of the syrups produced. For instance, at an oil temperature of 190° C., syrups of satisfactory quality could not be obtained above about 60 D.E. The usual commercial syrups have D.E. values up to 73 and for a commercial machine to be entirely useful, it must be capable of continuously producing a high quality syrup in the 73 D.E. range.

It is the object of the present invention to overcome the above difficulties of the Hughes process.

SUMMARY OF THE INVENTION

The present invention relates to a chemical reactor primarily for processing carbohydrate material, such as starch. The reactor comprises (a) an elongated tubular primary reactor having a plurality of flow tubes passing through a heat exchange vessel, said heat exchange vessel being adapted to receive superatmospheric steam, (b) a feed inlet to said primary reactor connected by way of a manifold to inlets of said plurality of flow tubes, (c) an outlet from said primary reactor comprising an outlet tube member connected by way of a manifold to outlets of said plurality of flow tubes, the tubes being arranged to provide substantially equal flow velocities through the primary reactor flow tubes, (d) a first flow restricting orifice connected to said single outlet tube, (e) an elongated secondary reactor tube having the inlet thereof flow connected to said first orifice outlet and (f) positive displacement pump means connected to said feed inlet tube.

DESCRIPTION OF THE PREFERRED EMBODIMENTS

The reactor is particularly useful for carrying out a continuous process for producing a modified carbohydrate material in homogeneous fluid form in which a slurry of carbohydrate material is continuously moved through a confined tubular preheat zone and heat is rapidly transferred to the slurry in the tubular zone whereby it passes through a gelation stage and forms into a hot free-flowing fluid having a temperature of at least 125° C. The heat is supplied from a steam bath containing superatmospheric steam and the temperature of the steam and the crosssectional area of each tubular preheat zone are selected to provide a rapid heating of the slurry such as to minimize the magnitude of the zone of high viscosity gel during the gelation stage. This hot fluid thus formed is then immediately forced through a restrictive opening and into a confined tubular reaction zone accompanied by a sudden decrease in pressure whereby the carbohydrate material is made highly reactive. This highly reactive material is continuously moved, together with a reactive adjunct, through the tubular reaction zone to produce a modified carbohydrate material in fluid form.

The carbohydrate material may be selected from the group consisting of unmodified carbohydrate material, chemically modified carbohydrate material, derivatized carbohydrate material and mixtures thereof. The most common such material is starch, e.g. corn, potato, tapioca, sago, rice, wheat, waxy maize, grain sorghum, and waxy sorghum. They can be used in refined form or as natural components in cereal grains. It is also possible to use hemicellulose containing materials, for example, the hull fibers isolated in the wet-milling industry.

The adjunct may be selected from acids, alkalis, salts and mixtures thereof as well as enzymes to produce a modified carbohydrate. Alternatively, the adjunct may be a carbohydrate derivatizing agent such as sodium tripolyphosphate, propylene oxide, 2,3-epoxypropyltrimethylammonium chloride, sodium chloroacetate, epoxychlorohydrin, acetic anhydride, maleic anhydride, 2-chloroethyl diethylamine hydrochloride, 2,3-epoxypropyl sulfonate, triethylamine, sulfur trioxide and urea.

Some of the molecules of native starches are extremely long and it may be necessary to break these down to a manageable point in the preheat zone. This can be done by means of a cleaving agent, such as an acid, in the carbohydrate slurry.

In a process of the present type, the carbohydrate slurry must pass through a gel stage and thereafter achieve a state of equilibrium. At equilibrium, the slurry has passed through a viscosity peak and has returned to a relatively low viscosity, e.g. less than 500 cps at 90° C. immediately after discharge without any substantial reaction of the carbohydrate material having taken place.

It is an important feature of this invention that the magnitude of the zone of high viscosity gel during the gelation stage is kept to a minimum, since this makes it possible to quickly achieve the state of equilibrium without the necessity of using extreme conditions of temperature and/or pressure in the preheat zone. This requires an extremely rapid heat input into the slurry in the preheat zone without substantial burning of the carbohydrate and this has been achieved according to this invention by means of individual tubular preheat zones of limited cross-sectional area which pass through a heating bath containing superatmospheric steam. The steam is generally at a pressure in the range of 100–250 psig, with a pressure in the range of about 100–125 psig being particularly preferred. The 100 psig steam provides a bath temperature of 166° C., while the 125 psig steam provides a bath temperature of 185° C. It is also particularly desirable to use saturated steam, since it provides a greater uniformity of heating.

It is also important to have the material pass through the preheat zone as quickly as possible since it has been found that long exposures to heating tends to encourage undesirable side reactions. This is particularly important in the hydrolysis of starch, since slow reactions tend to increase the production of materials such as gentiobiose, which gives a bitter taste in the product. With the process of this invention the carbohydrate slurry is normally passed through the gel stage and brought to equilibrium conditions at reaction temperature within about 100 seconds, preferably within about 25 to 45 seconds using a ½" I.D. preheat tube and within about 50–100 seconds using a 1" I.D. preheat tube. The actual slurry velocity is usually about 0.5 to 4 ft/sec, preferably 1 to 3 ft/sec.

At these equilibrium conditions and desired reaction temperatures, the hot carbohydrate liquid is forced through a restrictive opening and into a confined tubular reaction zone accompanied by a sudden decrease in pressure. This has the effect of greatly increasing the reactivity of the carbohydrate so that it will very quickly react with reactive adjuncts within the tubular reaction zone. Such adjuncts may be mixed with the carbohydrate slurry before passing through the preheat zone or it may be injected directly into the highly reactive material immediately following the restrictive opening.

The tubular preheat zone can be of any desired configuration, provided it is capable of maintaining a continuous flow of material. For instance, it may be a heat exchange tube through which the material is driven by means of a continuous displacement pump. In order to achieve the desired high rate of heat exchange throughout the slurry, the individual heat exchange tubes are preferably of relatively small diameter, e.g. less than 2 inches. It has been found to be particularly advantageous to use quite small diameter tubes in the range of about ½ inch to 1½ inches. With diameters of 1 inch or more, it may be advantageous to use static mixers to provide adequate mixing within the tubes.

Moreover, additional heating and mixing of the starch slurry can be achieved by direct injection of steam into the slurry within the tube, e.g. by injecting steam in the region of the preheat zone inlet. This can serve to very quickly raise the temperature of the slurry and will, of course, have some dilution effect on the slurry. The balance of the heating to equilibrium conditions is achieved by indirect heating in a steam bath.

The restrictive opening must have a cross-sectional area significantly smaller than the cross-sectional area of the individual preheat tubes and each opening preferably has a diameter of less than about 0.25 inch. The restrictive opening between the preheat zone and the reaction zone can be in the form of single opening, or a plurality of adjacent openings may be used.

The temperature of the material passing through the restrictive opening is at least 125° C. and is preferably in the range of 130° to 170° C. for acid hydrolysis of starch. Of course, for other reactions the temperatures may vary significantly from this.

The pressure on the inlet side to the restrictive opening is usually at least 300 psi and preferably at least 500 to 1000 psi. The upper limit is largely determined by the capability of the pump being used to pump the slurry through the system. There is a very marked pressure drop across the restrictive opening and this is preferably in the order of 300–600 psi.

The confined tubular reaction zone can also be of any desired configuration, provided it is capable of maintaining a continuous flow of material. It is preferably a heat exchange tube which may pass through either the preheat steam bath or a separate heat exchange bath at the same or different temperature from the preheat steam bath. The reaction tube can be the same size as the preheat tubes or larger or smaller diameter than the preheat tubes, depending on the materials being processed. Generally, the size of the reaction tube is less critical than is the size of the preheat tube since the material entering the reaction tube is already a freely flowing liquid at reaction temperature.

The residence time in the tubular reaction zone of ½ inch diameter is usually less than two minutes to produce a starch syrup having a D.E. of up to 73 and a high quality syrup of 73 D.E. has been produced according to this invention with a total residence time in a ½" diameter the preheat and reaction zone of less than 2½ minutes.

It is desirable that the pressure within the reactor be controlled entirely by the feed pump, rather than by any form of pressure responsive recycle loop. This can be achieved by means of a variable speed positive displacement pump, such as a Moyno pump, with the pressure in the reactor being controlled by the pump speed. In this manner, the material being processed travels through the reactor as a continuous forwardly moving mass.

A better control of this system is achieved if a control is maintained over the pressure within the tubular reaction zone and this can conveniently be achieved by providing a further restrictive opening at the outlet end of the reaction zone. The pressure within the reaction zone is preferably maintained at a level sufficient to keep the material in the reaction zone in the liquid stage, e.g. about 200 psi.

Certain preferred embodiments of the present invention are illustrated in the attached drawings in which.

Figure 1:
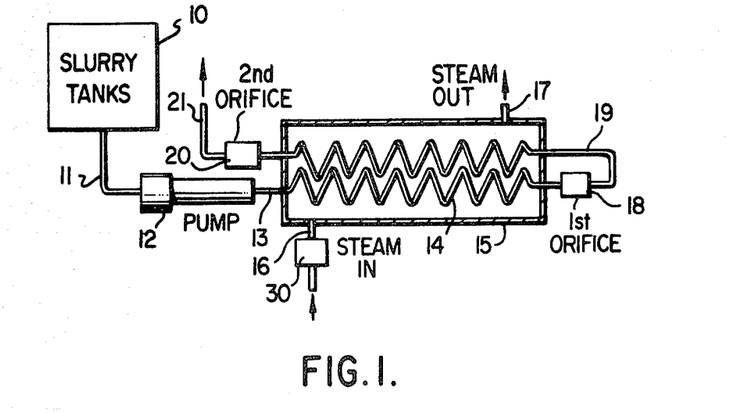
FIG. 1 is a schematic flow sheet showing apparatus for carrying out the invention.

As will be seen from FIG. 1, a holding tank 10 is provided for a starch slurry feed. This tank has an outlet line 11 which feeds into a Moyno pump 12. The slurry is pumped out of pump 12 to line 13 at high pressure and into a heating coil 14. The pressure within coil 14 is controlled by varying the speed of pump 12.

The main reactor of this apparatus is a closed and insulated vessel 15 which is essentially a steam vessel being supplied by a steam inlet line 16 and a steam outlet line 17. A steam control valve 30 is provided in the steam inlet line.

The tube 14 is made of stainless steel and is preferably arranged as a coil. This is the preheater for the reaction and the slurry passing through tube 14 passes through a gel stage and forms into a hot free flowing liquid. The outlet of preheat tube 14 feeds into a first restrictive opening or orifice 18 having a much smaller diameter than the diameter of tube 14. The outlet of the orifice 18 connects to a further stainless steel tube 19 which forms the tubular reaction zone of the invention. This tube in the form of a coil passes back through the steam vessel 15 and the reaction occurs during the travel of the hot liquid through coil 19.

In order to control the pressure within coil 19, a second restrictive opening or orifice 20 is provided at the outlet. The reaction product is then collected through outlet line 21.

Figure 2:
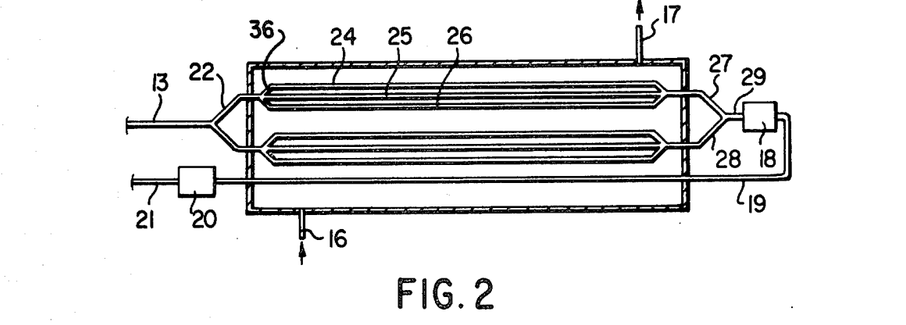
FIG. 2 is a schematic representation of one preferred embodiment of the apparatus.

FIG. 2 shows schematically an arrangement for a high capacity apparatus. Since one of the important features of this invention is the very short heating time of the reaction materials, it is most important to bring the starch slurry through the gel stage and up to reaction temperature as quickly as possible. This is achieved in FIG. 2 by connecting the slurry feed inlet 13 to a manifold consisting of two branch lines 22 and 23. Each of these branch lines is further divided into three additional branch lines 24, 25 and 26 within the heat exchange vessel. Thus, there are six preheat coils passing through vessel 15. This provides very quick heat transfer between the steam and the slurry passing through the coils.

Each group of three coils discharges into a single outlet tube 27 and 28 and these in turn feed into a single outlet line 29 which feeds into the first orifice 18. The remainder of the reaction then continues in the same manner as described above in FIG. 1.

Since the viscosity of the material being processed varies widely as it passes through the preheat zone, it is most important that the sizes of the tubes be such that at any point in the process there will be a constant velocity across all of the tubes. Thus, at the outlet of tubes 24, 25 and 26, it will be seen from FIG. 3 that the sizes of tubes 24, 25 and 26 on the one hand and tube 27 on the other hand must be such that the velocities in all four tubes will be constant. The same must be true for the three preheat tubes feeding into line 28 and the flow in lines 27 and 28 must also be at the same velocity so that the materials emerging from the various tubes will all be at the same stage of processing when they enter into line 29 and the first orifice 18.

The main branch lines 22 and 23 may include valves so that either one or both lines may be used. Moreover, these lines 22 and 23, along with lines 27 and 28, may include couplings so that individual bundles of tubes 24, 25, 26 may be removed for maintenance. With a bundle removed, the remainder of the reactor can continue operating.

Figures 3, 3A:
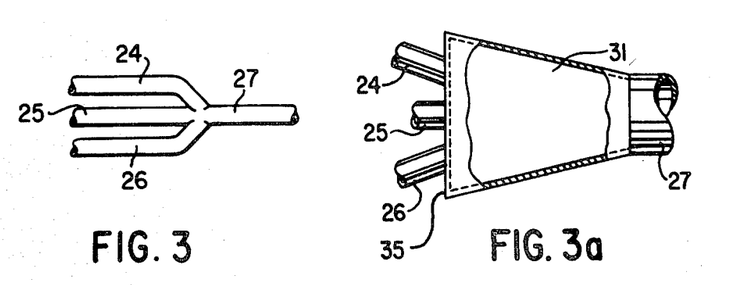
FIG. 3 is a detailed view of a tubular collector arrangement.
FIG. 3a is a sectional view of a preferred collector arrangement.

A preferred form of collector from the multiple preheater reaction tubes is shown in FIG. 3a. A problem that can be encountered when a series of tubes discharge into a single outlet tube is that if conditions within the multiple tubes are not absolutely identical, there may be a tendency for more rapid flow through one of the tubes than the others and this will then tend to channel into the outlet tube in preference to the slower tubes, resulting in a product which lacks homogeneity.

The collector in FIG. 3a is in the form of a truncated conical vessel 31 with the outlet portions of tubes 24, 25 and 26 having axes inclined towards the axis of the vessel 31 and being flow connected to vessel 31 through openings in large end cap 35 thereof. In this manner the streams from tubes 24, 25 and 26 impinge upon each other within vessel 31 thereby causing a uniform mixing at this point and discouraging any tendency of any single stream from one of tubes 24, 25 and 26 to channel directly into outlet tube 27. This collector vessel can be used at any point in the system where discharges from two or more tubes are being directed into a single tube.

The above systems show the reaction tube passing through the same heat exchange bath as the preheat tubes. It is, however, to be understood that depending on the reaction being carried out, the reaction tube may be partially or totally outside the heat exchange bath or may pass through a separate bath maintained at a temperature different from the preheat bath.

Another embodiment of the heater section of the reactor is shown in FIGS. 11 to 15. As will be seen from FIG. 11, it is a long thin unit having a tube shell 45 with an inlet tube 46 at one end and an outlet tube 47 at the opposite end. Because of the length of the unit, one or more expansion joints 48 may be provided. The shell 45 is supported by support stands 49.

Figure 11:
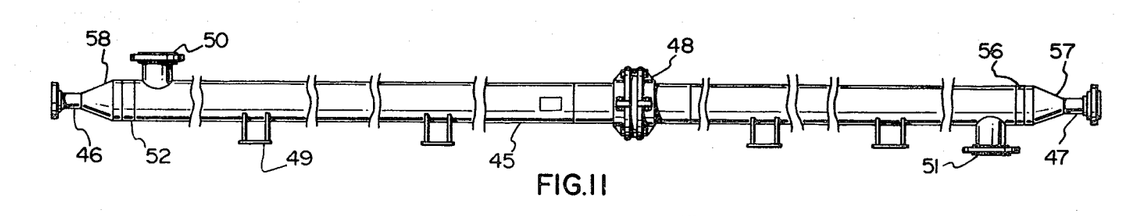
FIG. 11 is a side elevation of a preferred primary reactor.
Figure 12:
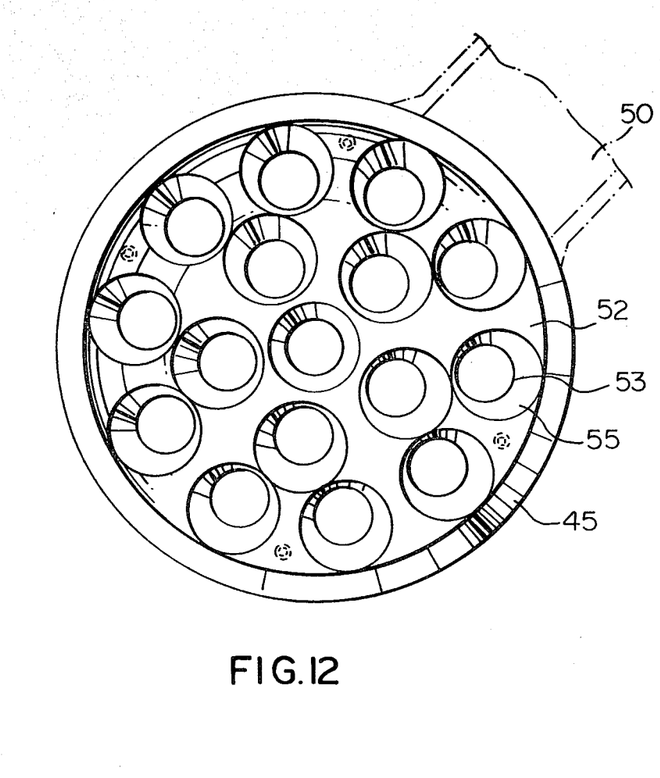
FIG. 12 is an end elevation or a primary reactor inlet.

Adjacent the inlet end of the shell is a steam inlet 50 and adjacent the outlet end is a steam outlet 51.

At the inlet end of shell 45 is a tube sheet 52 and at the outlet end of the shell is a tube sheet 56. The tube sheet 52 can be seen in greater detail in FIGS. 12 and 13 and it will be seen that it has a large number of holes within which are mounted tubes 53. The tube sheet at the opposite end of the shell contains corresponding holes for receiving the opposite ends of the tubes 53. Thus these tubes 53 extend the full length of shell 45 between tube sheet 52 and tube sheet 56.

The tube sheet 52 serves as the inlet and to provide a uniform distribution of slurry into the different tubes 53, the tube sheet 52 has an inner face 54 which tapers radially inwardly toward the central axis thereof. With this arrangement, all of the tube inlets except for the central tube are along this inclined face 54. Each tube 53 has a bevelled inlet 55 which shows in the irregular manner of FIG. 12 in end elevation.

Figure 13:
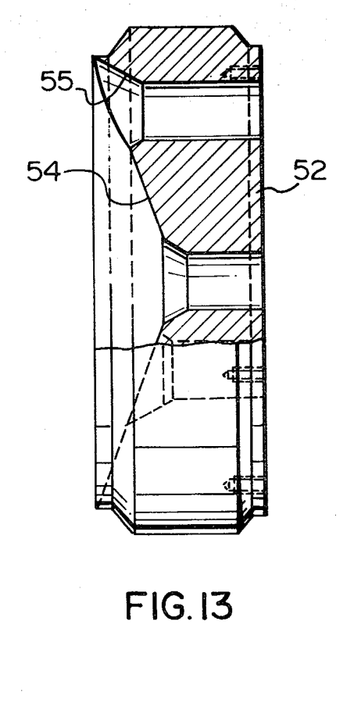
FIG. 13 is a partial sectional view of the inlet of FIG. 12.
Figure 14:
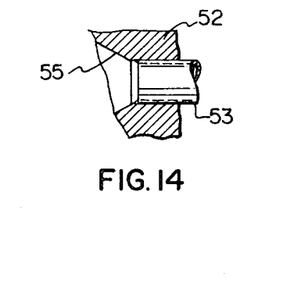
FIG. 14 is a partial sectional view of a single primary reactor tube inlet.

Between the inlet tube sheet 52 and the inlet tube 46 is a truncated conical chamber 58 which serves as a manifold for feeding the slurry from inlet tube 46 into the inlets of the tubes 53. This conical chamber 58 with the tube sheet 52 having the inclined face 54 serves to transfer the flow from tube 46 into the tube 53 in smooth flow paths inclined in the flow direction. A similar function is served by inclined tube portions 36 in FIG. 2 which split and direct flows from tube 22 into tubes 24, 25 and 26.

Figure 15:
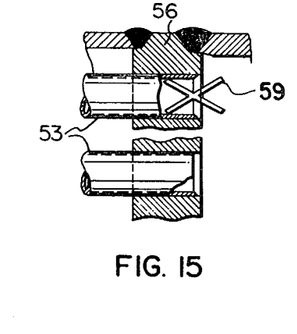
FIG. 15 is a partial sectional view of the primary reactor outlet.

At the opposite end between the outlet tube sheet 56 and the outlet tube 47 is a further truncated conical chamber 57 which serves as a collecting chamber for the fluid emerging from the tubes 53. To provide a uniform mixing of the fluids emerging from the different tubes 53, each tube outlet may include a Ross mixer 59. This conical chamber 57 serves the same purpose as the conical vessel 31 in FIG. 2, with the plate 56 replacing the end cap 35. The Ross mixers 59 are static mixers which deflect the discharges from the tubes 53, providing uniform mixing in a manner similar to the impinging streams from tubes 24, 25 and 26.

This system described in FIGS. 11 to 15 can replace the preheater or primary reactors shown in FIGS. 1 to 3. For instance, the outlet tube 47 as shown in FIG. 11 would connect to outlet tube 29 in FIG. 2 and feed through the first orifice 18, the secondary reactor 19 and the second orifice 20.

The following examples are further illustrative embodiments of this invention. All parts and proportions are by weight unless otherwise specified and all pressures are gauge pressures.

EXAMPLE 1

(a) The process was carried out using a reactor of the type described in FIG. 1. The coils 14 and 19 were made from ½" I.D. stainless steel tubing with coil 14 having a length of 120 feet and coil 19 having a length 40 feet. The first orifice had a diameter of 0.062 inch and the second orifice was in the form of a pair of adjacent openings, each having a diameter of 0.062 inch.

A starch slurry was formed from starch and water, this slurry containing 36.1% starch solids. 200 mls of hydrochloric acid were added to the slurry per 100 pounds of starch solids and this gave a slurry conductivity of 4100 micromhos at 30° C. This slurry passed through the reactor at a rate of 1.65 gallons per minute under the following reaction conditions:

TABLE 1

| REACTOR CONDITIONS: | |
|---|---|
| Temperatures: | |
| Steam supply | 167° C. |
| Steam after control valve | 163° C. |
| Steam bath (bottom) | 160° C. |
| Steam bath (top) | 160° C. |
| 1st orifice inlet | 148° C. |
| 1st orifice outlet | 148° C. |
| 2nd orifice inlet | 159° C. |
| Pressures: | |
| Steam supply | 100 psig |
| Steam after control valve | 82 psig |
| Feed pump outlet | 1000 psig |
| 1st orifice inlet | 750 psig |
| 1st orifice outlet | 470 psig |

The hot starch liquid immediately before the first orifice 18 had a viscosity of approximately 25 cps at 80° C. The product obtained had a D.E. of approximately 14.

(b) The above apparatus was modified to provide a preheat coil 80 feet long and reaction coils of varying lengths. With this arrangement, the residence time in the preheat zone was about 33 seconds and the total residence times in the reactor varied between 50 and 140 seconds.

Figure 4:
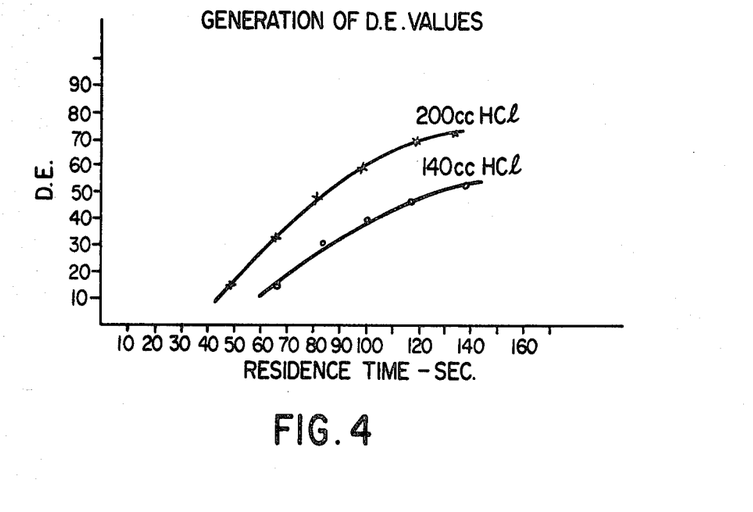
FIG. 4 is a plot of D.E. values against residence time in the reactor.
Figure 5:
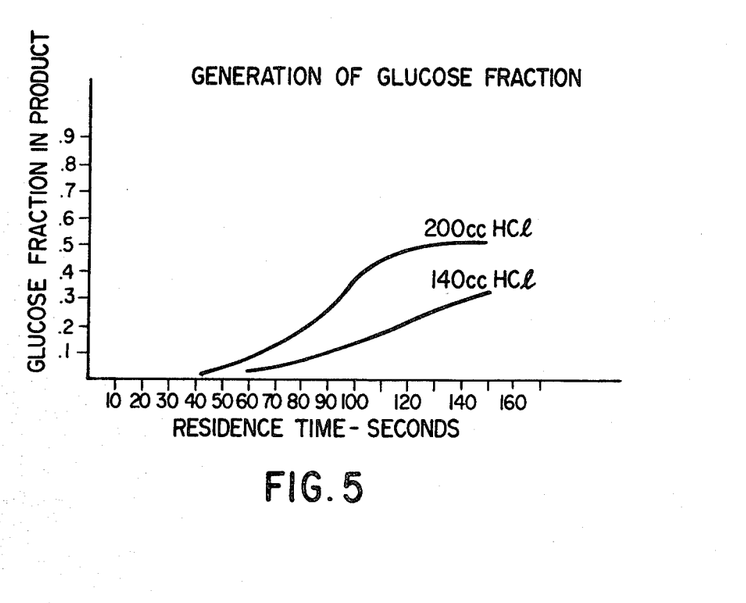
FIG. 5 is a plot of glucose values against residence time in the reactor.

The starch slurry feed contained 36.4% starch solids and runs were made with 140 and 200 mls of hydrochloric acid per 100 pounds of starch solids in the slurry. The steam bath temperature was 166° C., and the feed pump outlet pressure was 900 psi. This produced D.E. values ranging from about 15 to about 73, with the product being of excellent quality. The D.E. results are plotted on FIG. 4 and these show the very rapid generation of D.E. values within the reaction tube. FIG. 5 shows a separate plot of glucose fractions in the products from the above production runs.

EXAMPLE 2

(a) A series of additional test were carried out on the same apparatus as described above to produce corn syrups having D.E. values in excess of 70.

Again using half inch tubes, a test was carried out using a preheat coil having a length of 80 feet and a reactor coil having a length of 280 feet. The first orifice had a diameter of 0.062 inch and the second orifice consisted of two adjacent holes each having a diameter of 0.062 inch.

An aqueous starch slurry feed was prepared containing 34.8% starch solids and 190 mls of hydrochloric acid were added per 100 pounds of dry starch solids. This gave a conductivity of 3450 micromhos.

This slurry was pumped through the reactor at a flow rate of 1.5 gallons per minute under the following reaction conditions:

TABLE 2

| Reactor Conditions: | |
|---|---|
| Temperature: | |
| Steam supply | 330° F. |
| Steam after control valve | 330° F. |
| Steam bath (bottom) | 167° C. |
| Steam bath (top) | 165° C. |
| 1st orifice inlet | 145.6° C. |
| 1st orifice outlet | 145.9° C. |
| 2nd orifice inlet | 162° C. |
| Pressures: | |
| Steam supply | 99 psi |
| Steam after control valve | 97 psi |
| Feed pump outlet | 900 psi |
| 2nd orifice inlet | 200 psi |

The product obtained was a corn syrup having excellent taste with a D.E. of approximately 74. The product had a solids content of 44 to 45%.

(b) The above test was repeated using a preheat coil having a length of 80 feet and a reaction coil having a length of 240 feet. Otherwise the apparatus was unchanged.

The feed slurry was a pearl corn starch slurry containing 35.9% dry solids and 200 mls of hydrochloric acid per 100 pounds dry starch solids. This was pumped through the reactor at 1.45 gallons per minute with a first orifice inlet temperature of 146° C.

The product obtained had a D.E. of about 73, containing 48.4% glucose.

(c) The process was repeated using a preheat coil having a length of 8.4 m. and a reaction coil having a length of 16.8 m. Again the remainder of the apparatus was unchanged. The feed slurry contain 35.5% dry solids of pearl corn starch and had added thereto 190 mls of hydrochloric acid per 100 pounds dry starch solids. This was fed through the reactor at a rate of 1.57 gallons per minute and a first orifice inlet temperature of 161° C.

The product obtained had a D.E. of about 72 and contained 49.88% glucose and 19.37% dimers.

EXAMPLE 3

A series of studies were conducted using the same apparatus as described in Example 1 above to determine the rate of temperature rise of the starch slurry within the preheat coil and reaction coil. The slurry contained about 37% dry starch solids and runs were made with slurries containing 140 and 200 mls HCl. The flow velocity was about 2.6 ft/sec.

Figure 6:
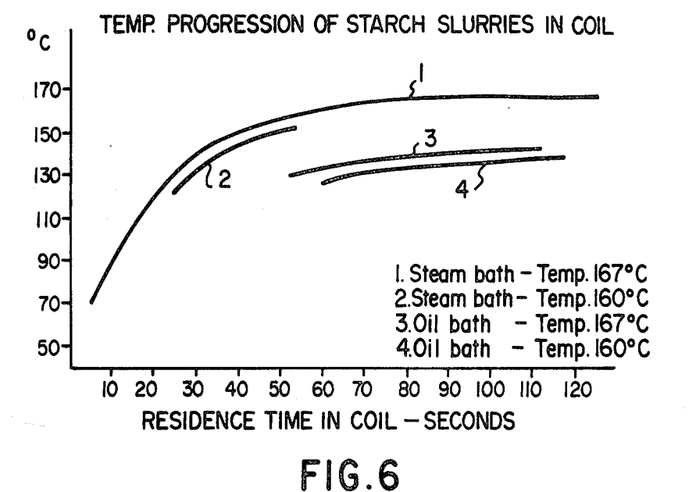
FIG. 6 is a plot of temperature progressions for steam and oil heated reactors.

These tests were conducted using a steam bath and an oil bath for heat exchange at bath temperatures of 160° C. and 167° C. The results obtained are shown in FIG. 6.

EXAMPLE 4

A test was carried out to illustrate the importance of rapid heat input in the preheat zone. The reactor of Example 1 was used with a preheat coil having a length of 80 feet.

Figure 7:
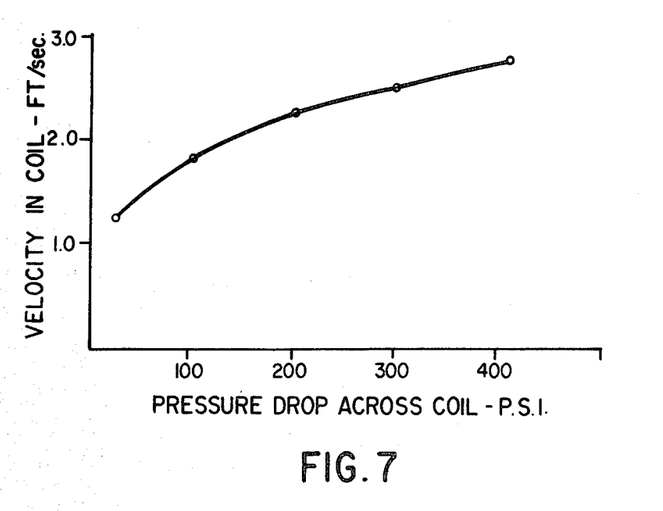
FIG. 7 is a plot of pressure drops against flow velocities for a steam reactor.

The feed slurry contained 37% dry starch solids and 200 mls of HCl per 100 pounds starch. The steam bath had a temperature of 165° C. The slurry was pumped through the reactor at different velocities and the pressure drops across the system were recorded, the results being shown in FIG. 7.

These show that with increasing velocities, there are very large increases in pressure drop. The very large pressure drops require very high inlet pressures with resulting heavy loads on the pump and other equipment. Thus, the faster is the heat transfer in the preheat zone, the faster the slurry passes through the gel stage and the less is the total energy required to drive the material through the tube.

EXAMPLE 5

A series of tests were carried out to directly compare the use of oil and steam baths in the production of starch syrups. The aim of these tests was to produce high quality syrups up to 73 D.E.

The equipment used was generally the same as that described in Example 1, using ½" I.D. stainless steel tubing for both the preheat zone and the reaction zone. The first orifice at the start of reaction zone had a diameter of 0.062 inch and the second orifice at the end of the reaction zone was in the form of a pair of adjacent openings, each having a diameter of 0.062 inch. The preheat zone in each test was heated either by recirculating oil or 100 psi saturated steam.

The steam heated reactor and one of the oil heated reactors used a preheater coil length of 80 feet while the second oil bath reactor used a preheater coil length of 120 feet. Varying reaction zone lengths were used from 40 to 280 feet with static mixers located at the 40 foot, 80 foot and 120 foot point of the reaction zone.

A starch slurry was formed from starch and water, this slurry containing 38% starch solids. 200 mls of 36% hydrochloric acid were added to the slurry per 100 pounds of starch solids and this slurry was passed through the reactor.

TABLE 3

OIL BATH

| BATH TEMP | HEAD TEMP | PRODUCT TEMP | MANIFOLD PRESS | HEAD PRESS | FLOW RATE |
|---|---|---|---|---|---|
| 169.2° C. | 143.5 1.5° C. | 169.2° C. | 1200 PSI | 325 PSI | 0.74 GPM |
| 169.5° C. | 144 1° C. | 167.4° C. | 1200 PSI | 350 PSI | 0.70 GPM |
| 169.4° C. | 144 1° C. | 167° C. | 1200 PSI | 350 PSI | 0.72 GPM |
| 169.2° C. | 144 2° C. | 166° C. | 1200 PSI | 350 PSI | 0.70 GPM |
| 169.2° C. | 145 1° C. | 162° C. | 1200 PSI | 350 PSI | 0.67 GPM |
| 169.3° C. | 144.5 1.5° C. | 156° C. | 1200 PSI | 350 PSI | 0.70 GPM |

| PRIMARY TR (SECS) | SECOND COIL LENGTH | SECOND TR (SECS) | DEX. EQUIV. | COLOUR CLARITY | TASTE |
|---|---|---|---|---|---|
| 97.6 | 260 FT. | 211.4 | 76.0 | 2/73 | Fail* |
| 102.6 | 200 FT. | 170.9 | 73.2 | 5/75 | Fail** |
| 100.0 | 160 FT. | 133.3 | 66.5 | 15/84 | Pass |
| 102.6 | 120 FT. | 102.6 | 51.4 | 20/75 | Pass |
| 107.1 | 80 FT. | 71.4 | 36.2 | 32/87 | Pass |
| 102.6 | 40 FT. | 34.2 | 19.5 | Too | Pass |

TABLE 3-continued

| OIL BATH |
|---|
| Cloudy |

*carmelized burned flavour and aftertaste
**some burned carmelized flavour, but no bitter aftertaste

TABLE 4

OIL BATH

| BATH TEMP | HEAD TEMP | PRODUCT TEMP | MANIFOLD PRESS | HEAD PRESS | FLOW RATE |
|---|---|---|---|---|---|
| 191.0° C. | 141 2° C. | 186° C. | 900 PSI | 240 PSI | 0.72 GPM |
| 190.8° C. | 141 3° C. | 184° C. | 900 PSI | 350 PSI | 0.75 GPM |
| 190.3° C. | 140 3° C. | 183° C. | 900 PSI | 350 PSI | 0.77 GPM |
| 190.0° C. | 141 2° C. | 179° C. | 900 PSI | 350 PSI | 0.78 GPM |
| 190.4° C. | 141.5 2.5° C. | 173° C. | 900 PSI | 300 PSI | 0.78 GPM |
| 190.5° C. | 137 5° C. | 169° C. | 900 PSI | 300 PSI | 0.82 GPM |

| PRIMARY TR (SECS) | SECOND COIL LENGTH | SECOND TR (SECS) | DEX. EQUIV. | COLOUR CLARITY | TASTE |
|---|---|---|---|---|---|
| 66.7 | 240 FT. | 200 | 81.8 | 0/2.1 | Fail* |
| 64.0 | 200 FT. | 160 | 80.1 | 1/17 | Fail* |
| 62.0 | 160 FT. | 124 | 80.2 | 1/50 | Fail* |
| 61.5 | 120 FT. | 92.3 | 76.2 | 3/72 | Fail** |
| 61.5 | 80 FT. | 61.5 | 57.4 | 19/87 | Pass |
| 58.4 | 40 FT. | 29.2 | 17.8 | Too Cloudy | Pass |

*Burned carmelized flavour and aftertaste.
**Carmelized burned flavour

TABLE 5

STEAM BATH

| BATH TEMP | HEAD TEMP | PRODUCT TEMP | MANIFOLD PRESS | HEAD PRESS | FLOW RATE |
|---|---|---|---|---|---|
| 166.7° C. | 141.5° C. | 166° C. | 810 PSI | 550 PSI | 1.45 GPM |
| 166.9° C. | 141.5° C. | 166.3° C. | 810 PSI | 550 PSI | 1.46 GPM |
| 166.9° C. | 142° C. | 166.5° C. | 810 PSI | 550 PSI | 1.45 GPM |
| 166.7° C. | 142° C. | 166.4° C. | 810 PSI | 550 PSI | 1.45 GPM |
| 166.5° C. | 141.5° C. | 165.8° C. | 810 PSI | 550 PSI | 1.43 GPM |
| 166.4° C. | 141.5° C. | 165.1° C. | 810 PSI | 550 PSI | 1.44 GPM |
| 166.6° C. | 141.5° C. | 155.5° C. | 810 PSI | 550 PSI | 1.44 GPM |

| PRIMARY TR (SECS) | SECOND COIL LENGTH | SECOND TR (SECS) | DEX. EQUIV. | COLOUR CLARITY | TASTE |
|---|---|---|---|---|---|
| 33.1 | 280 FT. | 115.7 | 73.4 | 7/80 | Pass* |
| 32.9 | 240 FT. | 98.8 | 70.4 | 10/83 | Pass |
| 33.1 | 200 FT. | 82.6 | 66.6 | 15/81 | Pass |
| 33.1 | 160 FT. | 66.1 | 46.9 | 32/87 | Pass |
| 33.6 | 120 FT. | 50.4 | 34.1 | 35/88 | Pass |
| 33.3 | 80 FT. | 33.3 | 22.1 | Too Cloudy | Pass |
| 33.3 | 40 FT. | 16.7 | 9.2 | Too Cloudy | Pass |

*Clean slight cereal smell with no bitter flavour or bitter aftertaste

The details of the reaction conditions and the results obtained are set out in Tables 3, 4 and 5 below.

Table 3 represents a test procedure showing the production of a marginally acceptable syrup of 73 D.E. using an oil bath. In this test, the oil bath was maintained at about 169° C. and a manifold pressure of 1200 psi was required to maintain a flow rate of about 0.7 gpm. This high pressure caused frequent pump failures using a Monyo positive displacement pump.

In Table 4 is shown the conditions and results from raising the oil temperature in the bath to approximately 190° C. Here a flow rate of 0.7 to 0.8 gpm was maintained with a manifold pressure of only 900 psi, but all of the high D.E. syrups exhibited a burned carmelized flavor and aftertaste.

In Table 5 is shown the results from a test carried out using a steam bath containing 100 psi saturated steam at a bath temperature of 166°–167° C. This provided a much higher flow rate of about 1.45 gpm at a manifold pressure of only 810 psi and quality products were produced up to 73 D.E. In fact, the oil bath required about 273 seconds to produce a 73 D.E. syrup, while the steam reactor produced a 73 D.E. syrup of equal or better quality in only 148 seconds.

Figure 8:
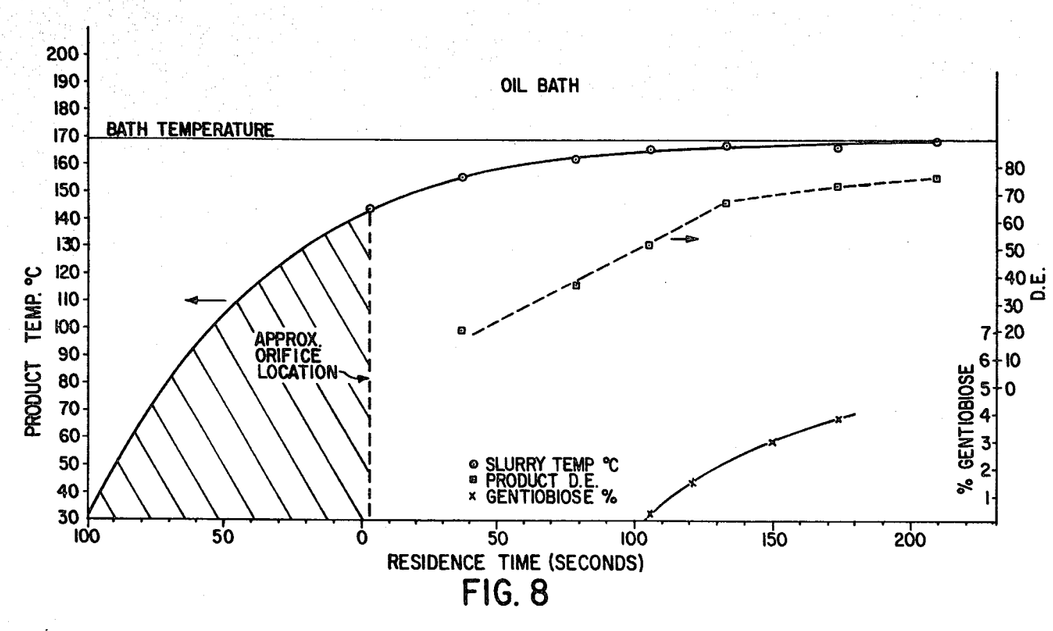
FIG. 8 is a plot of temperature rise, D.E. values and gentiobrose amounts for an oil bath heater reactor.
Figure 9:
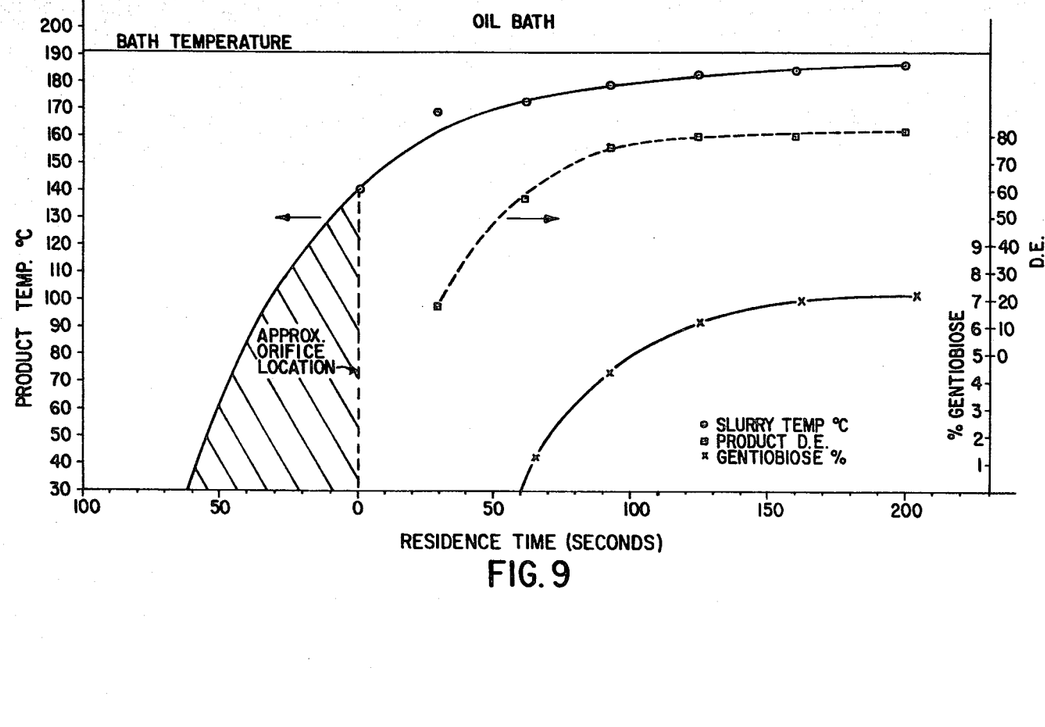
FIG. 9 is a plot similar to FIG. 8 using an oil bath at a higher temperature.
Figure 10:
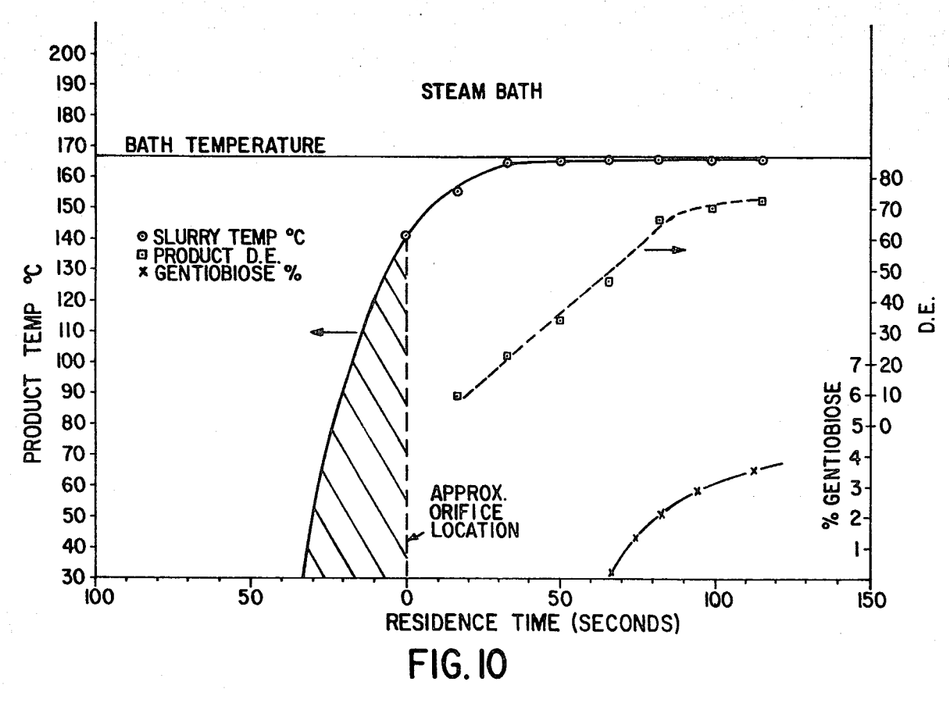
FIG. 10 is a plot similar to FIG. 8 using a steam heating bath.

Attached FIGS. 8, 9 and 10 rapidly illustrate the above points. These charts show temperature rise vs. time, D.E. rise vs. time and percentage gentiobiose in the product. The amount of gentiobiose is an excellent indicator of the degree of bitter taste in the product.

Zero time in the time scale represents the equilibrium state and is the location of the restriction zone and entry to the reaction zone. Thus, the region to the left of zero time represents the preheat zone and the region to the right of zero time represents the reaction zone.

FIG. 8 shows the results using an oil bath at 169° C., FIG. 9 shows the results using an oil bath at 190° C., and FIG. 10 shows the results using a steam bath at 167° C. From FIG. 8 there will be noted a very large area under the temperature curved to the left of zero time. This indicates a very large zone of high viscosity gel which, of course, causes a very high viscous drag resulting in the very high pressure requirements to drive the material through the tube. It will also be noted from FIG. 8 that the D.E. rises relatively slowly with time in the reaction zone.

FIG. 9 shows the oil bath at 190° C. and this higher bath temperature has been quite successful in decreasing the zone of high viscosity gel as illustrated by the greatly decreased area under the temperature curve to the left of zero time. A quite rapid increase in D.E. with time in the reaction zone is also noted. However, one of the most noteworthy features of FIG. 9 is the greatly increased production of gentiobiose as compared with FIG. 8 and this graphically illustrates one of the reasons why increasing oil bath temperature was not a solution to the problems encountered.

FIG. 10 illustrates the steam bath of this invention and compared with FIGS. 8 and 9 it will be seen that the area to the left of zero time under the temperature curve is even smaller. This indicates a further reduction in the zone of high viscosity gel and provides the reason for the rapid flow through the steam system at relatively moderate bath temperatures. Again, a very rapid increase in D.E. is noted with time and a relatively small amount of gentiobiose is produced.

EXAMPLE 6

To show the effects of increased tube diameters in the preheat zone, a series of tests were conducted on a commercial unit of the type shown in FIG. 2 containing nine parallel 1" I.D. preheat tubes having a length of 160 feet. The steam bath was operated at pressures between 100 and 125 psig.

A starch slurry was formed from starch and water, the slurry containing 37% starch solids and 210 mls hydrochloric acid per 100 pounds of starch solids. The slurry was fed through the system of preheat tubes at different flow rates of 20, 23 and 25 G.P.M. and the steam bath temperature ($T_B$) and the temperature within the preheat tubes immediately before the orifice ($T_H$) were measured.

The results obtained are given in the table below:

| FLOW RATE (G.P.M.) | PREHEAT RESIDENCE (Sec) | $T_B$ (°C.) | $T_H$ (°C.) |
|---|---|---|---|
| 25 | 71 | 167 | 128 |
| 23 | 77 | 167 | 133–134 |
| 20 | 89 | 167 | 141 |
| 25 | 71 | 184 | 144 |
| 25 | 71 | 180 | 140 |

We claim:

1. A chemical reactor comprising (a) an elongated tubular primary reactor having a plurality of laterally spaced flow tubes passing through a heat exchange vessel, said heat exchange vessel being adapted to receive superatmospheric steam, (b) a feed inlet to said primary reactor connected by way of a manifold to inlets of said plurality of flow tubes, said manifold comprising a truncated conical member with an open small end and a large end closed by a plate member, the open small end connecting to said feed inlet, and said primary reactor flow tubes connecting through openings in said large end plate member, the inner face of said plate member being radially outwardly inclined toward the axis thereof, (c) tube member connected by way of a manifold to outlets of said plurality of flow tubes, the tubes being arranged to provide substantially equal flow velocities through the primary reactor flow tubes, (d) a first flow restricting orifice connected to said single outlet tube, (e) an elongated secondary reactor tube having the inlet thereof flow connected to said first orifice outlet and (f) positive displacement pump means connected to said feed inlet tube.

2. A reactor according to claim 1 wherein said heat exchange vessel includes a plurality of said inlet tube members and a plurality of said outlet tube members, each pair of inlet and outlet tube members having a plurality of said primary reactor flow tubes connected therebetween.

3. A reactor according to claim 1 wherein said plurality of inlet tube members are flow connected to a single feed pump.

4. A reactor according to claim 3 wherein said pump is a variable speed pump, the speed of the pump being used as a pressure control means for the reactor.

5. A reactor according to claim 4 wherein each of said primary reactor flow tubes has an inside diameter of no more than about 1½ inches.

6. A reactor according to claim 1 wherein said elongated secondary reaction tube passes through the heat exchange vessel containing the primary reactor flow tubes.

7. A reactor according to claim 1 wherein said elongated secondary reaction tube passes through a separate heat exchange vessel.

8. A reactor according to claim 1 wherein said outlet manifold comprises a continuous flow collector connected to said primary reactor flow tube outlets, said collector having a truncated conical shape with a closed large end and an open small end, the open small end connecting to said outlet tube member, and said primary reactor flow tubes connecting through openings in said large end, said primary reactor flow tubes adjacent said openings being inclined toward the axis of the collector such that the flows from the primary reactor flow tubes intersect and mix within the collector.

9. A reactor according to claim 1 wherein the inner end of each said opening in the end plate member includes a bevelled countersink flow inlet.

10. A reactor according to claim 1 wherein the primary reactor tubes are arranged with an axially positioned tube and a plurality of further tubes spaced in concentric circles.

11. A starch reactor comprising (a) an elongated tubular primary reactor having a plurality of parallel flow tubes passing through a heat exchange vessel, said heat exchange vessel being adapted to receive superatmospheric steam, (b) a feed inlet to said primary reactor connected by way of a manifold to inlets of said plurality of flow tubes, said inlet manifold comprising a truncated conical member with an open small end and a large end closed by an end plate member, the open small end connecting to said feed inlet, and said primary reactor flow tubes connecting through openings in said large end plate member, the inner face of said plate member being radially outwardly inclined toward the axis thereof, (c) an outlet from said primary reactor comprising an outlet tube member connected by way of a manifold to outlets of said plurality of flow tubes, said outlet manifold comprising a continuous flow collector connected to said primary reactor flow tube outlets, said collector having a truncated conical shape with a closed large end closed by an end plate member and an open small end, the open small end connecting to said outlet tube member, and said primary reactor flow tubes connecting through openings in said large end plate member, and the tubes being arranged to provide substantially equal flow velocities through the primary reactor flow tubes, (d) a first flow restricting orifice connected to said single outlet tube, (e) an elongated secondary reactor tube having the inlet thereof flow connected to said first orifice outlet and (f) positive displacement pump means connected to said feed inlet tube.

12. A reactor according to claim 11 having flow deflectors in the outlets of said plurality of flow tubes to cause fluid mixing in the outlet manifold.

13. A reactor according to claim 12 wherein the inner end of each opening in the end plate member of the inlet manifold includes a bevelled countersink flow inlet.

14. A reactor according to claim 12 or 16 wherein the primary reactor tubes are arranged with an axially positioned tube and a plurality of further tubes spaced in concentric circles.

15. A chemical reactor comprising
   (a) an elongated tubular primary reactor having a plurality of laterally spaced flow tubes passing through a heat exchange vessel, said heat exchange vessel being adapted to receive superatmospheric stream,
   (b) a feed inlet to said primary reactor connected by way of a manifold to inlets of said plurality of flow tubes, said manifold comprising an inlet tube flow connected to the inlets of the flow tubes by way of flow distributor means adapted to transfer the flow from the inlet tube into the plurality of flow tubes in smooth flow paths inclined outwardly in the flow direction relative to the axis of the inlet tube,
   (c) an outlet from said primary reactor comprising an outlet tube member connected by way of a manifold to outlets of said plurality of flow tubes, said outlet manifold comprising a continuous flow collector connected to said primary reactor flow tube outlets, said collector having a truncated conical shape with a closed large end and an open small end, the open small end connecting to said outlet tube member, and said primary reactor flow tubes connecting through openings in said large end, said primary reactor flow tubes being arranged such that the flows from the primary reactor flow tubes intersect and mix within the collector,
   (d) a first flow restricting orifice connected to said single outlet tube,
   (e) an elongated secondary reactor tube having the inlet thereof flow connected to said first orifice outlet and
   (f) positive displacement pump means connected to said feed inlet tube.

* * * * *